United States Patent [19]

Hirano

[11] Patent Number: 4,948,236

[45] Date of Patent: Aug. 14, 1990

[54] SOFT-FOCUS LENS SYSTEM

[75] Inventor: Hiroyuki Hirano, Tokyo, Japan

[73] Assignee: Asahi Kogaku Kogyo Kabushiki Kaisha, Tokyo, Japan

[21] Appl. No.: 311,919

[22] Filed: Feb. 17, 1989

[30] Foreign Application Priority Data

Feb. 19, 1988 [JP] Japan ................................ 63-36623

[51] Int. Cl.$^5$ ....................... G02B 13/20; G02B 9/08; G02B 9/18; G02B 9/36
[52] U.S. Cl. ................................. 350/431; 350/470; 350/476; 350/480
[58] Field of Search ................ 350/431, 470, 476, 480

[56] References Cited

U.S. PATENT DOCUMENTS 4,310,221  1/1982  Momiyama et al. ................ 350/431

FOREIGN PATENT DOCUMENTS 52-141223 11/1977 Japan .
54-156531 12/1979 Japan .
55-129308 10/1980 Japan .
56-50309   5/1981 Japan .

Primary Examiner—Scott J. Sugarman
Attorney, Agent, or Firm—Sughrue, Mion, Zinn, Macpeak & Seas

[57] ABSTRACT

A soft-focus lens system can be composed of, in order from the object side, a front group having a one-group-two-element or two-group-two-element composition of a positive and negative lens element with a positive overall power and a rear group having a one-group-two-element or two-group-two-element composition of a negative and a positive power. If conditions of the system are such that the system has a brightness in the range of 1:2.8 to 1:3.5 in terms of F number and a viewing angle of about 40 degrees, a desired soft-focus effect over the entire picture is produced.

11 Claims, 5 Drawing Sheets

SOFT-FOCUS LENS SYSTEM

BACKGROUND OF THE INVENTION

The present invention relates to a soft-focus lens system for use in photography.

Various types of soft-focus lens systems have been proposed and they are roughly divided into two types. The first of these types is a system having spherical aberration intentionally left in it which has not been compensated for. The other type is a system having chromatic abberation left in it which has not been compensated for. The second type is generally referred to as the "chromatic abberation type" and is unsuitable for color photography and is not commonly employed in modern cameras. Therefore, soft-focus lens systems used today are generally of the first type. This "spherical aberration type" is subdivided into: (A) a tertiary aberration type (e.g., IMAGON of Rodenstock Instruments Corporation, 200 mm, H5.8; and SMC PENTAX SOFT of Asahi Kokaku Kogyo Kabushiki Kaisha, 85 mm, F 2.2); (B) a higher-order aberration type, e.g., the systems described in JP-A-52-141223 and JP-A-56-50309 (the term "JP-A" as used herein means an "unexamined published Japanese patent application"); and (C) an adjustable higher-order aberration type, e.g., the systems described in JP-A-54-156531 and JP-A-55-129308.

The construction of type (A) is fairly simple (it is mostly constructed of a one-group-two-element composition) and the soft-focusing effect is normally controlled by adjustment of a diaphragm stop. However, in most systems of type (A), the compensation for curvature of the field and astigmatism are frequently insufficient to ensure a wide viewing angle. If one strains to widen the viewing angle, coma will occur so that the sharpness of the image is impaired.

Type (B) has the advantage that focusing is easily accomplished compared to focusing a type (A) system. However, in order to produce higher-order aberrations, lens surfaces of strong curvature are necessary. This causes an increase in lens thickness and sensitivity to unwanted phenomena such as eccentricity. As a result, an increase occurs not only in the size of the lens system but also in the manufacturing cost.

The main feature of type (C) is that it is capable of adjusting the soft-focusing effect with the diaphragm stopped down to the same value. However, this type requires a complex lens composition and lens moving mechanism and its manufacturing cost is considerably higher than that or types (A) and (B).

SUMMARY OF THE INVENTION

The present invention has been accomplished in order to solve the problems discussed above and its principal object is to provide an inexpensive soft-focus lens system that is simple in composition (composed of 4 lens elements), has a brightness in the range of 1:2.8 to 1:3.5 in terms of F number, features a viewing angle of about 40 degrees and which produces a desired soft-focusing effect over the area of the whole picture.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENTS

Figure 1:
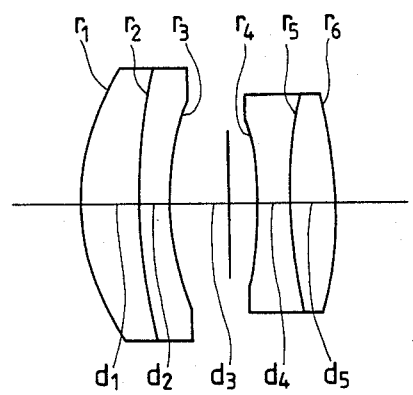
FIGS. 1, 3, 5, 7 and 9 are simplified cross-sectional views of the lens systems constructed in accordance with Examples 1, 2, 3, 4 and 5, respectively.
Figure 2:
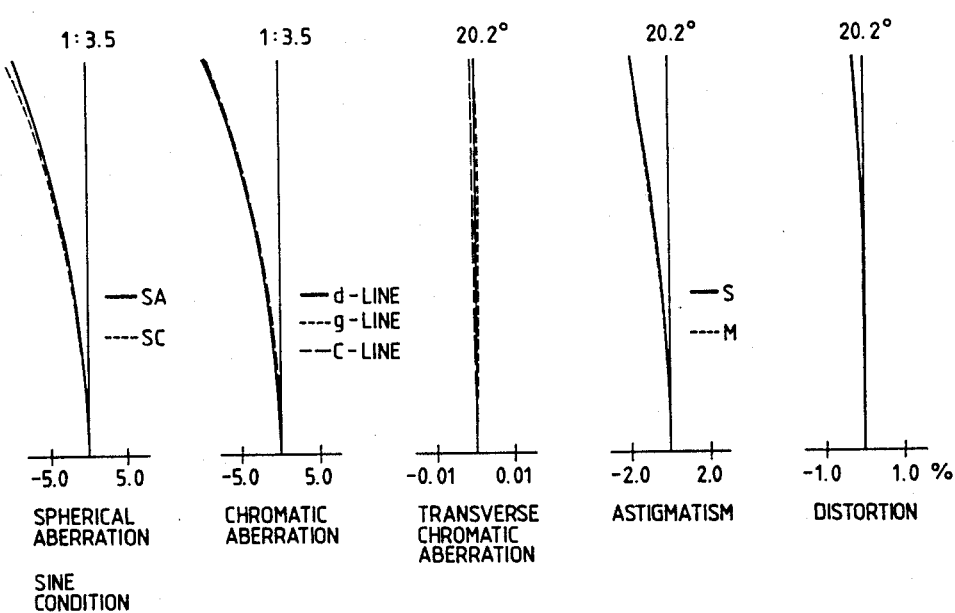
FIGS. 2, 4, 6, 8 and 10 are graphs plotting the abberation curves obtained with the lens systems constructed in accordance with Examples 1, 2, 3, 4 and 5, respectively.
Figure 3:
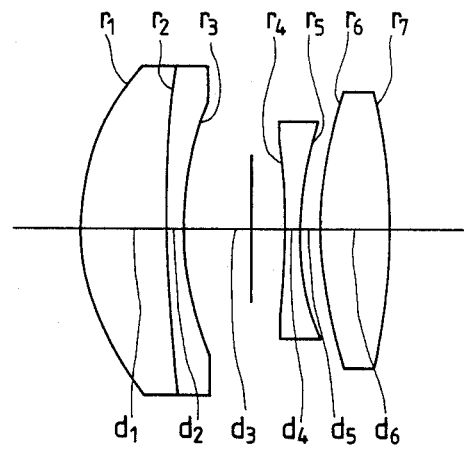
Figure 4:
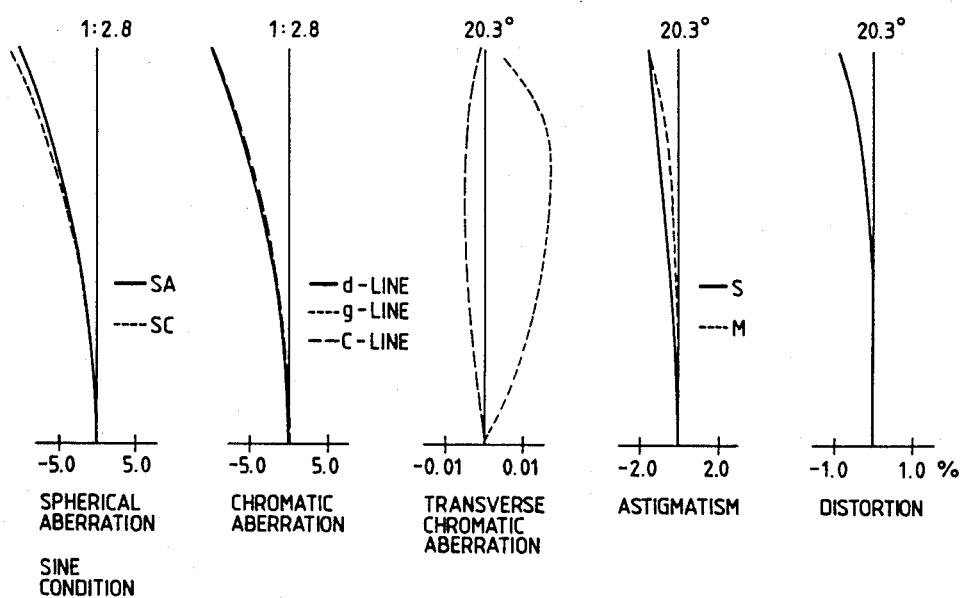
Figure 5:
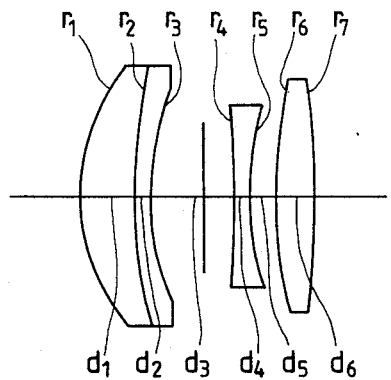
Figure 6:
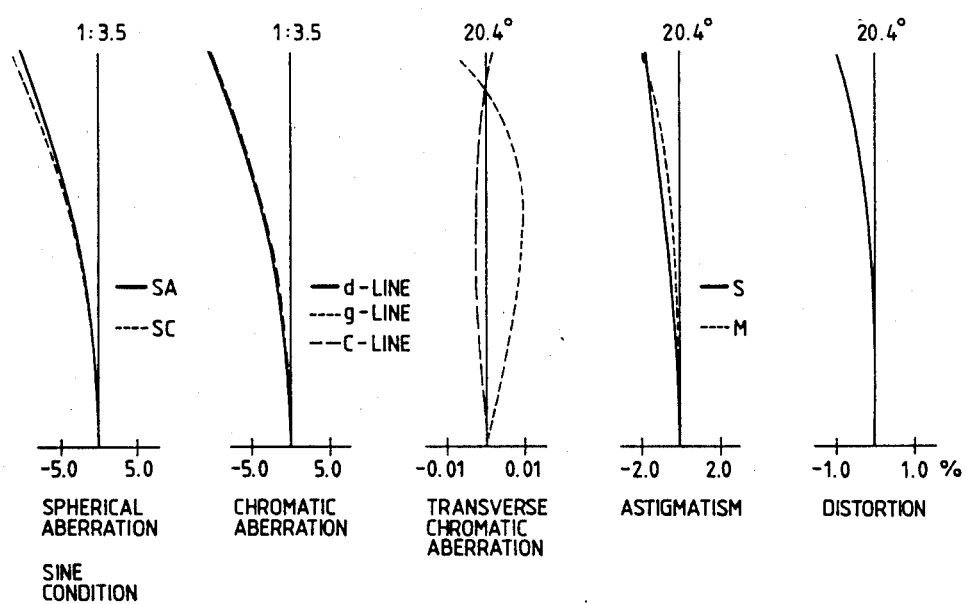
Figure 7:
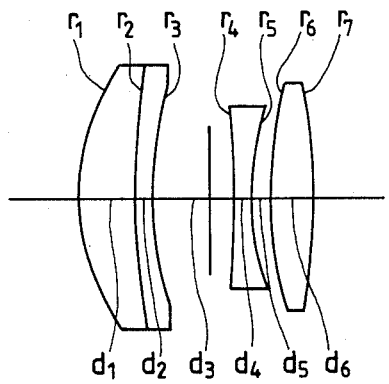
Figure 8:
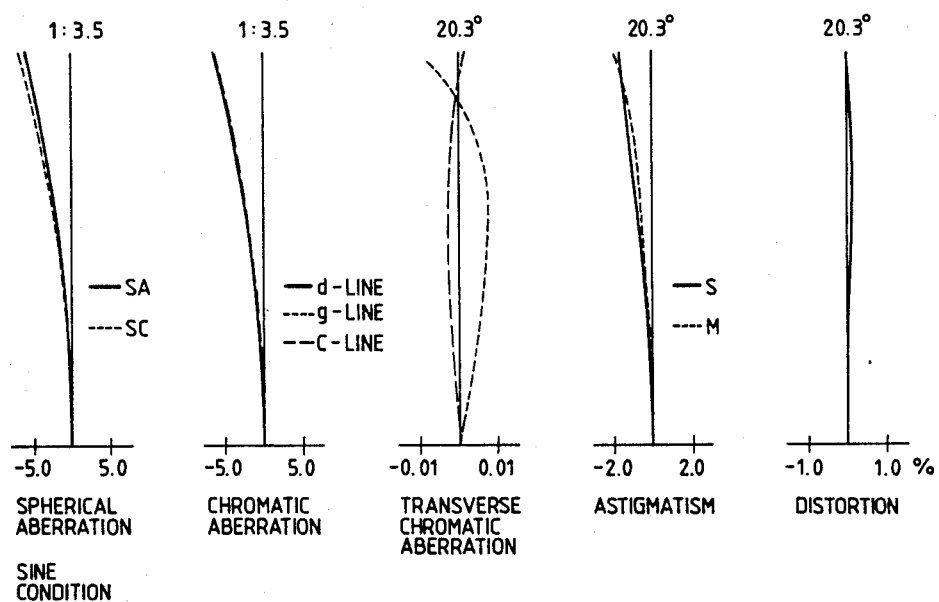
Figure 9:
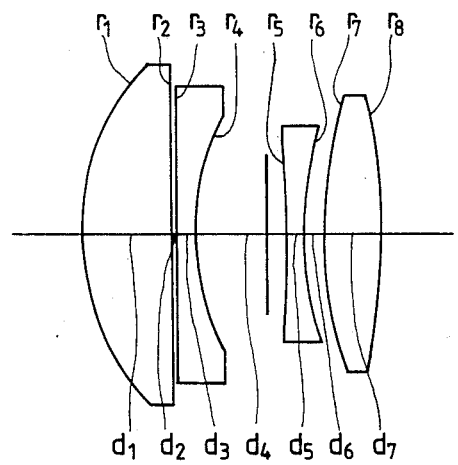
Figure 10:
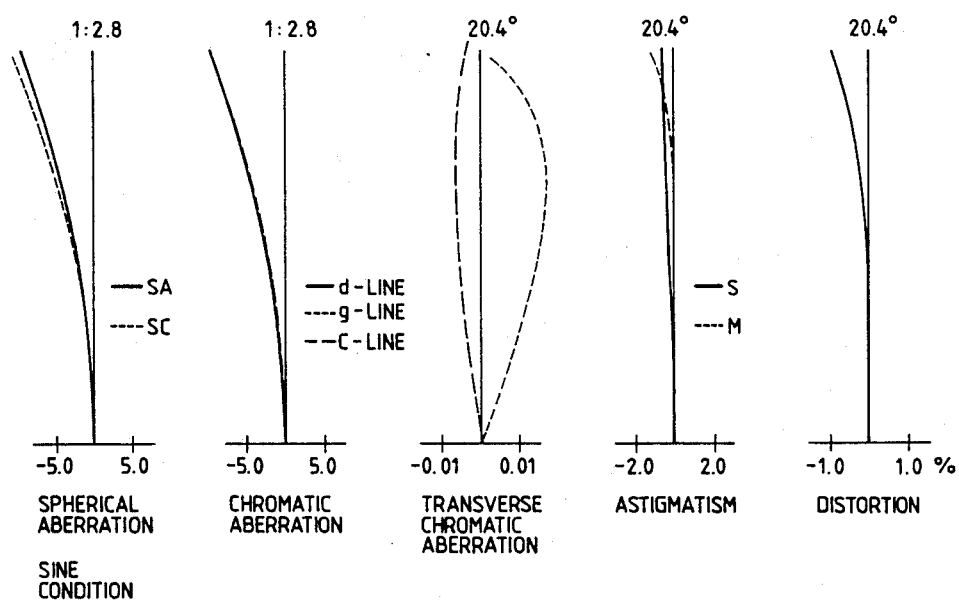

The above-stated object of the present invention can be attained by a soft-focus lens system that comprises, in order from the object side, a front group having a one-group-two-element or two-group-two element composition of a positive and a negative lens element and which has a positive overall power, and a rear group having a one-group-two-element or two-group-two-element composition of a negative and a positive lens element and which has a positive overall power. The lens system also satisfies the following conditions:

(1) $0.25 < r_{FF}/f < 0.45$
(2) $0.2 < P < 0.5$
(3) $15 < \nu_1 - \nu_2 < 30$.

In a preferred embodiment, the soft-focus lens system of the present invention further satisfies the following conditions:

(4) $0.4 < |r_{RL}|/f < 1.0$ $$\left| \frac{\nu_3 f_3 + \nu_4 f_4}{f} \right| < 8.0. \quad (5)$$

In the soft-focus lens system of the present invention, a diaphragm stop is positioned between the front and rear groups.

The symbols used in conditions (1) to (5) have the following meanings:

$r_{FF}$: the radius of curvature of the first surface of the front group f: the focal length of the overall system;

P: the Petzval sum of the overall system when the focal length of the overall system is calculated as 1.0;

$\nu_1$: the Abbe number of the positive lens element in the front group;

$\nu_2$: the Abbe number of the negative lens element in the front group;

$r_{RL}$: the radius of curvature of the last surface of the rear group;

$\nu_3$: the Abbe number of the negative lens element in the rear group;

$f_3$: the focal length of the negative lens element in the rear group;

$\nu_4$: the Abbe number of the positive lens element in the rear group; and $f_4$: the focal length of the positive lens element in the rear group.

The mechanism of the action of the soft-focus lens system of the present invention is described hereinafter with reference to conditions (1) through (5).

Condition (1) relates to the spherical aberration that will be produced on the first surface of the front group. If the upper limit of this condition is exceeded, the occurrence of spherical aberration is insufficient to enable the system to be used as a soft-focus lens system. If the lower limit of this condition is not reached, coma and other non-spherical aberrations will occur on the first surface of the front group in an amount too great to be appropriately compensated for.

Condition (2) relates to curvature of field and must be satisfied in order to attain a viewing angle of the order of 40 degrees. If the upper limit of this condition is exceeded, the flatness of the image will not be maintained. If the lower limit of this condition is not reached, astigmatism will increase to an amount that is too great to be appropriately compensated for.

Condition (3) relates to chromatic aberration. If this condition is not met, difficulty arises in achieving proper compensation for chromatic aberration.

In order to attain a uniform soft-focusing effect over the whole area of the picture, spherical aberration must be produced symmetrically not only with respect to axial but also extra-axial rays. In the present invention, this need for compensation is satisfied by ensuring that the radius of curvature of the last surface of the lens system is within the range specified by condition (4). Stated more specifically, conditions (1) and (4) guarantee that spherical aberration will be produced in the same direction. Since condition (1) largely contributes to the upper part of extra-axial rays and condition (4) mostly influences the lower part of those rays, symmetrical aberration can be created by satisfying these two conditions. As for the chromatic aberration that will be produced in the rear group, condition (5) is desirably satisfied in order to attain balance in chromatic aberration between the front and rear groups.

In the following, five examples of the present invention are described by way of data sheets, in which: $F_{NO}$ signifies an F number; f, focal length; $\omega$, half viewing angle; $f_B$, back focus; r, the curvature radius of an individual lens surface; d, lens thickness or aerial lens distance; n, the refractive index of an individual lens element at the D-line; and $\nu$, the Abbe number of an individual lens element.

EXAMPLE 1

$F_{NO} = 1:3.5$  $f = 100.00$
$\omega = 20.2°$  $f_B = 80.29$

| Surface No. | r | d | n | $\nu$ |
|---|---|---|---|---|
| 1 | 34.341 | 8.47 | 1.71285 | 43.2 |
| 2 | 81.616 | 4.42 | 1.84666 | 23.8 |
| 3 | 40.538 | 12.99 | | |
| 4 | −57.691 | 4.68 | 1.63980 | 34.5 |
| 5 | 70.288 | 6.77 | 1.84100 | 43.2 |
| 6 | −57.113 | | | |

$r_{FF}/f = 0.34$
$P = 0.35$
$\nu_1 - \nu_2 = 19.4$
$|r_{RL}|/f = 0.57$ $\left| \dfrac{\nu_3 f_3 + \nu_4 f_4}{f} \right| = 0.26$

EXAMPLE 2

$F_{NO} = 1:2.8$  $f = 100.00$
$\omega = 20.3°$  $f_B = 70.38$

| Surface No. | r | d | n | $\nu$ |
|---|---|---|---|---|
| 1 | 35.663 | 12.59 | 1.70000 | 48.1 |
| 2 | 204.915 | 2.49 | 1.72825 | 28.5 |
| 3 | 48.615 | 14.75 | | |
| 4 | −145.270 | 2.49 | 1.62096 | 35.9 |
| 5 | 46.552 | 2.98 | | |
| 6 | 59.687 | 10.18 | 1.74320 | 49.3 |
| 7 | −85.173 | | | |

$r_{FF}/f = 0.36$
$P = 0.42$
$\nu_1 - \nu_2 = 19.6$

EXAMPLE 2-continued $|r_{RL}|/f = 0.85$ $\left| \dfrac{\nu_3 f_3 + \nu_4 f_4}{f} \right| = 3.73$

EXAMPLE 3

$F_{NO} = 1:3.5$  $f = 100.00$
$\omega = 20.4°$  $f_B = 76.29$

| Surface No. | r | d | n | $\nu$ |
|---|---|---|---|---|
| 1 | 29.183 | 7.93 | 1.65844 | 50.9 |
| 2 | 73.163 | 2.51 | 1.72825 | 28.5 |
| 3 | 40.535 | 12.09 | | |
| 4 | −244.350 | 2.51 | 1.72825 | 28.5 |
| 5 | 45.663 | 3.59 | | |
| 6 | 62.808 | 6.26 | 1.80610 | 40.9 |
| 7 | −97.182 | | | |

$r_{FF}/f = 0.29$
$P = 0.43$
$\nu_1 - \nu_2 = 22.4$
$|r_{RL}|/f = 0.97$ $\left| \dfrac{\nu_3 f_3 + \nu_4 f_4}{f} \right| = 4.70$

EXAMPLE 4

$F_{NO} = 1:3.5$  $f = 100.00$
$\omega = 20.3°$  $F_B = 76.14$

| Surface No. | r | d | n | $\nu$ |
|---|---|---|---|---|
| 1 | 32.479 | 8.37 | 1.65844 | 50.9 |
| 2 | 122.334 | 2.51 | 1.72825 | 28.5 |
| 3 | 55.422 | 12.14 | | |
| 4 | −127.992 | 2.51 | 1.72825 | 28.5 |
| 5 | 40.608 | 2.84 | | |
| 6 | 59.733 | 6.27 | 1.83400 | 37.2 |
| 7 | −84.246 | | | |

$r_{FF}/f = 0.32$
$P = 0.42$
$\nu_1 - \nu_2 = 22.4$
$|r_{RL}|/f = 0.84$ $\left| \dfrac{\nu_3 f_3 + \nu_4 f_4}{f} \right| = 3.92$

EXAMPLE 5

$F_{NO} = 1:2.8$  $f = 100.00$
$\omega = 20.4°$  $f_B = 69.26$

| Surface No. | r | d | n | $\nu$ |
|---|---|---|---|---|
| 1 | 34.956 | 12.80 | 1.77250 | 49.6 |
| 2 | 634.408 | 1.29 | | |
| 3 | −731.750 | 2.50 | 1.67270 | 32.1 |
| 4 | 36.221 | 13.51 | | |
| 5 | −266.631 | 2.50 | 1.62096 | 35.9 |
| 6 | 48.612 | 2.99 | | |
| 7 | 59.824 | 8.46 | 1.74320 | 49.3 |
| 8 | −86.980 | | | |

$r_{FF}/f = 0.35$
$P = 0.28$
$\nu_1 - \nu_2 = 17.5$
$|r_{RL}|/f = 0.87$ $\left| \dfrac{\nu_3 f_3 + \nu_4 f_4}{f} \right| = 4.05$ As previously described, the soft-focus lens system of the 4-element composition of the present invention which ensures a brightness on the order of 1:2.8–1:3.5 in terms of F number and which provides a viewing angle of about 40 degrees can be designed to produce a desired soft-focusing effect by satisfying either conditions (1) through (3) or conditions (1) through (5).

What is claimed is:

1. A soft-focus lens system comprising, in order from the object side:

a front lens group consisting of a positive first lens and a negative second lens; and a rear lens group consisting of a negative third lens and a positive fourth lens;

said lens system satisfying the following conditions:

(1) $0.25 < r_{FF}/f < 0.45$ (2) $0.2 < P < 0.5$ (3) $15 < \nu_1 - \nu_2 < 30$ wherein $r_{FF}$ is the radius of curvature of the first surface of the front group;

f is the focal length of the overall system;

P is the Petzval sum of the overall system when the focal length of the overall system is calculated as 1.0;

$\nu_1$ is the Abbe number of the positive lens element in the front group; and $\nu_2$ is the Abbe number of the negative lens element in the front group.

2. A soft-focus lens system as claimed in claim 1, further satisfying the following conditions:

(4) $0.4 < |r_{RL}|/f < 1.0$ $$\left| \frac{\nu_3 f_3 + \nu_4 f_4}{f} \right| < 8.0, \quad (5)$$

wherein $r_{RL}$ is the radius of curvature of the last surface of the rear group;

$\nu_3$ is the Abbe number of the negative lens element in the rear group;

$f_3$ is the focal length of the negative lens element in the rear group;

$\nu_4$ is the Abbe number of the positive lens element in the rear group; and $f_4$ is the focal length of the positive lens element in the rear group.

3. A soft-focus lens system as claimed in claim 1, wherein a diaphragm stop is positioned between said front group and said rear group.

4. A soft-focus lens system as claimed in claim 2, further satisfying the following conditions:

| $F_{NO} = 1:3.5$ | | $f = 100.00$ | | |
| $\omega = 20.2°$ | | $f_B = 80.29$ | | |
| Surface No. | r | d | n | $\nu$ |
| --- | --- | --- | --- | --- |
| 1 | 34.341 | 8.47 | 1.71285 | 43.2 |
| 2 | 81.616 | 4.42 | 1.84666 | 23.8 |
| 3 | 40.538 | 12.99 | | |
| 4 | −57.691 | 4.68 | 1.63980 | 34.5 |
| 5 | 70.288 | 6.77 | 1.84100 | 43.2 |
| 6 | −57.113 | | | |

| $r_{FF}/f$ | $= 0.34$ |
| --- | --- |
| P | $= 0.35$ |
| $\nu_1 - \nu_2$ | $= 19.4$ |
| $|r_{RL}|/f$ | $= 0.57$ |

$$\left| \frac{\nu_3 f_3 + \nu_4 f_4}{f} \right| = 0.26.$$

5. A soft-focus lens system as claimed in claim 2, further satisfying the following conditions:

| $F_{NO} = 1:2.8$ | | $f = 100.00$ | | |
| $\omega = 20.3°$ | | $f_B = 70.38$ | | |
| Surface No. | r | d | n | $\nu$ |
| --- | --- | --- | --- | --- |
| 1 | 35.663 | 12.59 | 1.70000 | 48.1 |
| 2 | 204.915 | 2.49 | 1.72825 | 28.5 |
| 3 | 48.615 | 14.75 | | |
| 4 | −145.270 | 2.49 | 1.62096 | 35.9 |
| 5 | 46.552 | 2.98 | | |
| 6 | 59.687 | 10.18 | 1.74320 | 49.3 |
| 7 | −85.173 | | | |

| $r_{FF}/f$ | $= 0.36$ |
| --- | --- |
| P | $= 0.42$ |
| $\nu_1 - \nu_2$ | $= 19.6$ |
| $|r_{RL}|/f$ | $= 0.85$ |

$$\left| \frac{\nu_3 f_3 + \nu_4 f_4}{f} \right| = 3.73.$$

6. A soft-focus lens system as claimed in claim 2, further satisfying the following conditions:

| $F_{NO} = 1:3.5$ | | $f = 100.00$ | | |
| $\omega = 20.4°$ | | $f_B = 76.29$ | | |
| Surface No. | r | d | n | $\nu$ |
| --- | --- | --- | --- | --- |
| 1 | 29.183 | 7.93 | 1.65844 | 50.9 |
| 2 | 73.163 | 2.51 | 1.72825 | 28.5 |
| 3 | 40.535 | 12.09 | | |
| 4 | −244.350 | 2.51 | 1.72825 | 28.5 |
| 5 | 45.663 | 3.59 | | |
| 6 | 62.808 | 6.26 | 1.80610 | 40.9 |
| 7 | −97.182 | | | |

| $r_{FF}/f$ | $= 0.29$ |
| --- | --- |
| P | $= 0.43$ |
| $\nu_1 - \nu_2$ | $= 22.4$ |
| $|r_{RL}|/f$ | $= 0.97$ |

$$\left| \frac{\nu_3 f_3 + \nu_4 f_4}{f} \right| = 4.70.$$

7. A soft-focus lens system as claimed in, claim 2, further satisfying the following conditions:

| $F_{NO} = 1:3.5$ | | $f = 100.00$ | | |
| $\omega = 20.3°$ | | $f_B = 76.14$ | | |
| Surface No. | r | d | n | $\nu$ |
| --- | --- | --- | --- | --- |
| 1 | 32.479 | 8.37 | 1.65844 | 50.9 |
| 2 | 122.334 | 2.51 | 1.72825 | 28.5 |
| 3 | 55.422 | 12.14 | | |
| 4 | −127.992 | 2.51 | 1.72825 | 28.5 |
| 5 | 40.608 | 2.84 | | |
| 6 | 59.733 | 6.27 | 1.83400 | 37.2 |
| 7 | −84.246 | | | |

| $r_{FF}/f$ | $= 0.32$ |
| --- | --- |
| P | $= 0.42$ |
| $\nu_1 - \nu_2$ | $= 22.4$ |
| $|r_{RL}|/f$ | $= 0.84$ |

$$\left| \frac{\nu_3 f_3 + \nu_4 f_4}{f} \right| = 3.92.$$

8. A soft-focus lens system as claimed in claim 2, further satisfying the following conditions:

| $F_{NO} = 1:2.8$ | | $f = 100.00$ | | |
| $\omega = 20.4°$ | | $f_B = 69.26$ | | |
| Surface No. | r | d | n | $\nu$ |

-continued

| | | | | |
|---|---|---|---|---|
| 1 | 34.956 | 12.80 | 1.77250 | 49.6 |
| 2 | 634.408 | 1.29 | | |
| 3 | −731.750 | 2.50 | 1.67270 | 32.1 |
| 4 | 36.221 | 13.51 | | |
| 5 | −266.631 | 2.50 | 1.62096 | 35.9 |
| 6 | 48.612 | 2.99 | | |
| 7 | 59.824 | 8.46 | 1.74320 | 49.3 |
| 8 | −86.980 | | | |

$r_{FF}/f = 0.35$
$P = 0.28$
$\nu_1 - \nu_2 = 17.5$
$|r_{RL}|/f = 0.87$
$\left|\dfrac{\nu_3 f_3 + \nu_4 f_4}{f}\right| = 4.05.$ 9. A soft-focus lens system comprising, in order from the object side:
   a front lens group comprised by a positive first lens and a negative second lens; and
   a rear lens group comprised by a negative third lens and a positive fourth lens;
   said system having a brightness in terms of F number in the range of 1:2.8 to 1:3.5 and a viewing angle in the range of 35 to 45 degrees.

10. A soft-focus lens system as claimed in claim 1 or 9, wherein said positive first lens and said negative second lens are cemented to each other.

11. A soft-focus lens system as claimed in claim 1 or 9, wherein said negative third lens and said positive fourth lens are cemented to each other.

* * * * *